C. DE LUKACSEVICS AND E. LOFFLER.
ANNULAR VALVE CONSTRUCTION.
APPLICATION FILED APR. 30, 1920.
1,390,967.
Patented Sept. 13, 1921.
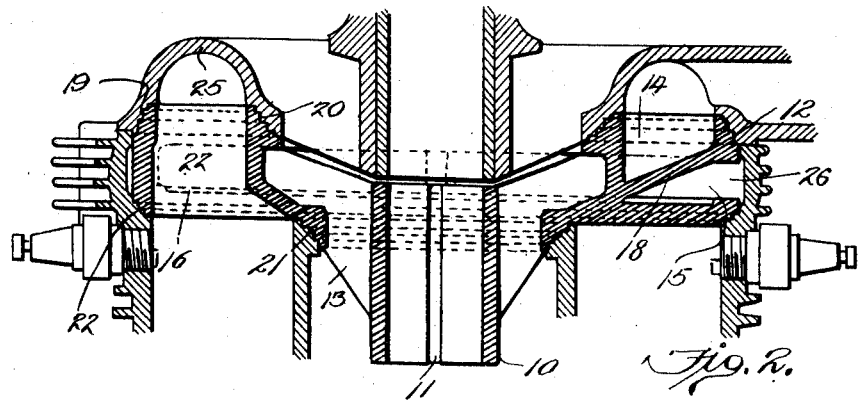
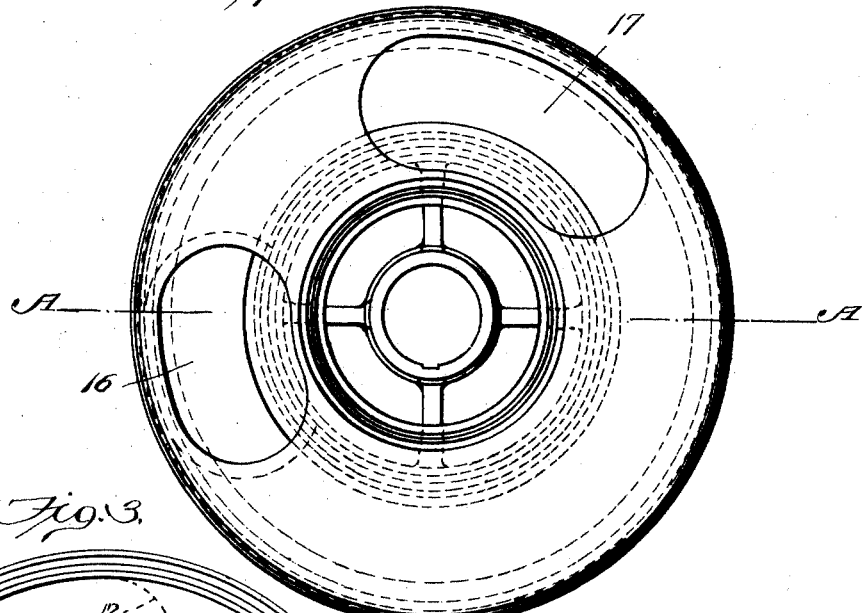
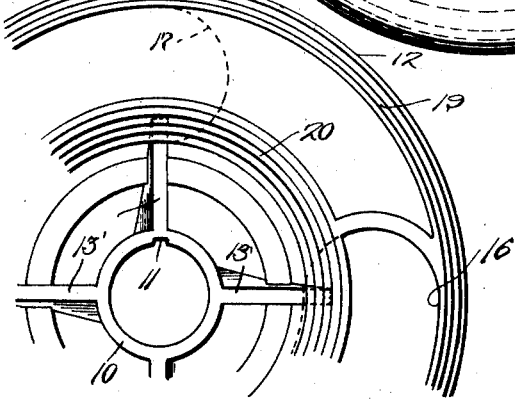
Inventors
Charles de Lukacsevics
Edmund Loffler
by
Attorney

UNITED STATES PATENT OFFICE.

CHARLES DE LUKACSEVICS AND EDMUND LOFFLER, OF NEW YORK, N. Y.

ANNULAR VALVE CONSTRUCTION.

1,390,967.  Specification of Letters Patent.  Patented Sept. 13, 1921.

Original application filed April 30, 1920, Serial No. 377,986. Divided and this application filed April 30, 1920. Serial No. 377,987.

*To all whom it may concern:*

Be it known that we, CHARLES DE LUKACSEVICS and EDMUND LOFFLER, citizens of the United States, residing at New York, in the county of New York and State of New York, have invented new and useful Improvements in Annular Valve Construction, of which the following is a specification.

This invention relates generally to valves and more particularly to valves adapted to be used for controlling the functions of the cylinders of an internal combustion engine. This application is a division of our application for internal combustion engine Serial No. 377,986, filed April 30, 1920.

The object of the invention is to provide a valve having adjacent inlet and exhaust chambers separated by a wall whereby the incoming combustible mixture may be subjected to the heat of the exhaust gases.

A further object of the invention is to provide a single valve for controlling a plurality of engine cylinders.

A further object of the invention is to provide a valve adapted to be rotatably mounted and carried by a shaft and having gas tight bearing engagement with the engine cylinders which bearings receive no wear.

Further objects and advantages of the invention will become apparent upon reference to the specification, wherein the invention is described in connection with the accompanying drawings, in which:—

Figure 1 is a side elevation of one form of my invention showing also portions of the cylinder construction associated with the valve.

Fig. 2 is a section on the line A—A of Fig. 1.

Fig. 3 is a plan view of a part of the valve with the cylinders and intake manifold removed, showing a modified form of fan blade.

The valve structure shown in Figs. 1 and 2 consists of the hollow hub portion 10 having key-way 11 whereby it may be mounted upon and rotatably secured to a shaft. The annular portion 12 of the valve is connected to the hub by means of the slanting ribs or fan blades 13 and is provided with the peripheral inlet and exhaust chambers 14 and 15 respectively. The inlet chamber 14 communicates with the combustion chamber of the engine through lateral inlet port 16 which passes completely through the annular portion 12, and the exhaust chamber communicates with said combustion space through exhaust port 17 passing through the inner side wall of said annular portion. The inlet port 16 extends transversely through the interior of the annular portion of the valve and is of substantially the same angular extent as the inlet port of the engine cylinder, whereby on registration of the inlet port of the valve with the inlet port of the cylinder a large and free passage is afforded for the incoming gas from the intake manifold 25, so that the cylinders may rapidly be supplied with the combustible mixture.

The exhaust port 17 is preferably of such extent that one of the cylinders of the engine will be practically continually exhausting through the valve and imparting the heat from the exhaust gas to the dividing wall 18 between the peripheral inlet and exhaust chambers.

The bearing portion of the valve where it contacts with the cylinders is provided with stepped surfaces 19, 20, 21, 22, which afford gas tight engagement surfaces, but inasmuch as the valve is completely supported by the hub 10 it is not necessary for these surfaces to have wearing contact with the cylinders. As the valve rotates the ribs or fan blades 13 create a draft of air for cooling the valve and the engine cylinders.

In Fig. 3 the ribs or fan blades 13' are angularly disposed for creating a draft of air for cooling the valve and engine cylinders and augmenting the air supplied for this purpose due to the forward movement of the vehicle upon which the engine may be mounted.

In operation the incoming gases, owing to the suction of the engine, will pass through the inlet chamber 14 and the inlet port 16, and the exhaust gases from the engine will pass through the exhaust port and the peripheral exhaust chamber 15, it being understood that the peripheral inlet and exhaust chambers are in communication with correspondingly shaped inlet and exhaust passages 25, 26. The incoming gases, therefore, are subjected to the heat from the exhaust gas as conducted through the dividing wall 18. This heat will serve to vaporize any unvaporized fuel, thereby adding greatly to the efficiency of the engine. The fan blades 13 act to cool the engine cylinders and the valves so that the ordinary fan may be dispensed with.

We claim:

1. A valve for an internal combustion engine comprising a hub portion for supporting the valve on an actuating shaft, and an annular body portion having adjacent annular inlet and exhaust chambers formed therein, said exhaust chamber being open peripherally to an exhaust outlet passage and communicating with the engine cylinders through a lateral port, said inlet chamber being open laterally to an inlet passage on one side of said annular body portion and having a lateral port extending completely through said annular body portion and communicating with the engine cylinders on the other side of said annular body portion.

2. A valve for a multiple cylinder engine, comprising an annular body portion having adjacent annular inlet and exhaust chambers and lateral ports affording communication severally between said chambers and the engine cylinders, a hub portion and ribs connecting said portions, adapted to create a current of air when the valve is rotated, for cooling purposes.

3. A valve for an internal combustion engine, comprising an annular body portion having inlet and exhaust ports formed therein for controlling the engine cylinders, a hub portion adapted to be rotatably secured to an actuating shaft and ribs connecting said portions adapted to create a current of air for cooling purposes when the valve is rotated.

In testimony whereof we have hereunto set our hands in presence of two subscribing witnesses.

CHARLES DE LUKACSEVICS.
EDMUND LOFFLER.

Witnesses:
HARRIET ROBINSON,
JOHN WARD.